United States Patent [19]

Fujimoto et al.

[11] Patent Number: 4,485,625
[45] Date of Patent: Dec. 4, 1984

[54] CONTROL MEANS FOR INTERNAL COMBUSTION ENGINES

[75] Inventors: Misao Fujimoto; Shoso Ishii; Yoshikuni Yada; Shigeki Imazu, all of Hiroshima, Japan

[73] Assignee: Toyo Kogyo Co., Ltd., Hiroshima, Japan

[21] Appl. No.: 368,355

[22] Filed: Apr. 14, 1982

[30] Foreign Application Priority Data

Apr. 15, 1981 [JP] Japan .................................. 56-57479
Jul. 2, 1981 [JP] Japan ................................ 56-104222
Jul. 2, 1981 [JP] Japan ................................ 56-104223

[51] Int. Cl.$^3$ .......................... F02B 33/00; F02M 7/00
[52] U.S. Cl. ......................................... 60/601; 60/602; 60/605; 123/494; 123/571
[58] Field of Search ....................... 123/421, 494, 571; 60/605, 601, 599, 602

[56] References Cited

U.S. PATENT DOCUMENTS

| | | | |
|---|---|---|---|
| 2,378,037 | 6/1945 | Reggio | 123/421 |
| 2,833,355 | 5/1958 | Reggio | 60/601 |
| 2,988,872 | 6/1961 | Reggio | 60/601 |
| 3,057,938 | 10/1962 | Perry | 123/421 |
| 3,543,738 | 12/1970 | Barber | 123/418 |
| 3,982,503 | 9/1976 | Keranen | 123/494 |
| 4,347,570 | 8/1982 | Akiyama | 123/571 |
| 4,349,004 | 9/1982 | Matsuda | 123/571 |

FOREIGN PATENT DOCUMENTS

| | | | |
|---|---|---|---|
| 45-30090 | of 0000 | Japan | 123/421 |
| 55-96350 | 7/1980 | Japan | 123/571 |
| 2006988 | 5/1979 | United Kingdom | 123/571 |

*Primary Examiner*—Ronald B. Cox
*Attorney, Agent, or Firm*—Fleit, Jacobson, Cohn & Price

[57] ABSTRACT

An internal combustion engine has an air-fuel ratio control system, an exhaust gas recirculation system and an ignition system. At least one of the systems is adjusted when the intake air temperature is very high so that fast combustion is suppressed. The adjustment is effective to prevent detonation or similar unusual combustion which may occur under a very high temperature of the intake air.

2 Claims, 9 Drawing Figures

CONTROL MEANS FOR INTERNAL COMBUSTION ENGINES

The present invention relates to internal combustion engines and more particularly to control means for such internal combustion engines.

It has been recognized that the state of combustion in internal combustion engines depends to a certain degree on the temperature of intake gas. More precisely, a general knowledge is that an increase in the intake gas temperature causes a decrease in the intake charge to the combustion chamber and at the same time produces a relatively rich mixture due to a decrease in the density of the intake air. Such rich mixture causes a poor combustion in the combustion chamber which results together with the decreased charge in a decrease in the engine output. Further, the rich mixture has an adverse effect on the fuel consumption of the engine. By the contrary, a decrease in the intake gas temperature tends to produce a relatively lean mixture which is apt to cause a misfire problem.

In view of the above problems, measures have been taken to improve combustibility of the mixture in response to an increase in the intake gas temperature. For example, Japanese patent application No. 49-80572 filed on July 14, 1974 and disclosed for public inspection on Jan. 27, 1976 under the disclosure number of 51-10227 proposes to provide a fuel supply compensation device which functions to decrease the fuel supply in response to an increase in the intake gas temperature to thereby maintain a mixing ratio close to the stoichiometric value. It has further been known to advance the ignition timing as the intake gas temperature increases so as to accomplish the same purpose. In an engine having an exhaust gas recirculation system, the amount of recirculation gas may be decreased in response to an increase in the intake gas temperature.

It should however be noted that, although the combustibility of the mixture in the combustion chamber decreases as the intake gas temperature increases to a certain degree, a further increase in the intake gas temperature may possibly cause an explosive combustion or detonation. The aforementioned conventional measures for improving combustibility in response to an increase in the intake gas temperature have adverse effects under an extremely high temperature of the intake gas. The Japanese patent application No. 49-80572 previously referred to teaches to make the fuel supply compensation device inoperative above a certain intake gas temperature, for example, 20° C. However, the proposed device is not sufficient to prevent such explosive combustion or detonation under an extremely high engine temperature.

It is therefore an object of the present invention to provide engine control means which can effectively prevent an explosive combustion or detonation under a very high intake gas temperature.

Another object of the present invention is to provide engine control means which is effective to prevent engine damages due to excessively high temperature and excessively high pressure.

According to the present invention, the above and other objects can be accomplished by an internal combustion engine including combustion chamber means, intake passage means leading to said combustion chamber means, means for providing combustible air-fuel mixture which is to be charged to said combustion chamber means, ignition means for igniting the air-fuel mixture charged in the combustion chamber means, exhaust passage means extending from said combustion chamber means for exhausting combustion gas from said combustion chamber means, intake gas temperature sensing means for sensing temperature of intake gas passing through said intake passage means, control means for controlling said air-fuel mixture means modifying means for adjusting said control means so as to enrich the air-fuel mixture to suppress fast combustion under an intake gas temperature higher than a predetermined value.

In one mode of the present invention, the control means includes means for adjusting said air-fuel mixture providing means and said modifying means includes means for controlling said adjusting means so as to enrich the air-fuel mixture under the intake gas temperature higher than the predetermined value. The mixing ratio of the mixture may be gradually changed in accordance with a change in the intake gas temperature. Under the intake gas temperature lower than the predetermined value, fuel supplied may be decreased in response to an increase in the intake gas temperature so that the air-fuel mixture of a substantially stoichiometric mixing ratio is maintained. In another mode which may be applied to an engine having an exhaust gas recirculating system, said control means includes means for controlling amount of combustion gas recirculated from said exhaust passage means to said intake passage means and said modifying means includes means for controlling said adjusting means so that the amount of recirculated combustion gas is increased in response to an increase in the intake gas temperature under the intake gas temperature higher than the predetermined value. Under the intake gas temperature lower than the predetermined value, the amount of the recirculated combustion gas may be decreased in response to an increase in the intake gas temperature. In a further different mode of the present invention, the control means includes means for controlling timing of said ignition means and the modifying means includes means for controlling the adjusting means so that the ignition timing is retarded in response to an increase in the intake gas temperature.

The above and other objects and features of the present invention will become apparent from the following descriptions of preferred embodiments taking reference to the accompanying drawings, in which.

Figure 1:
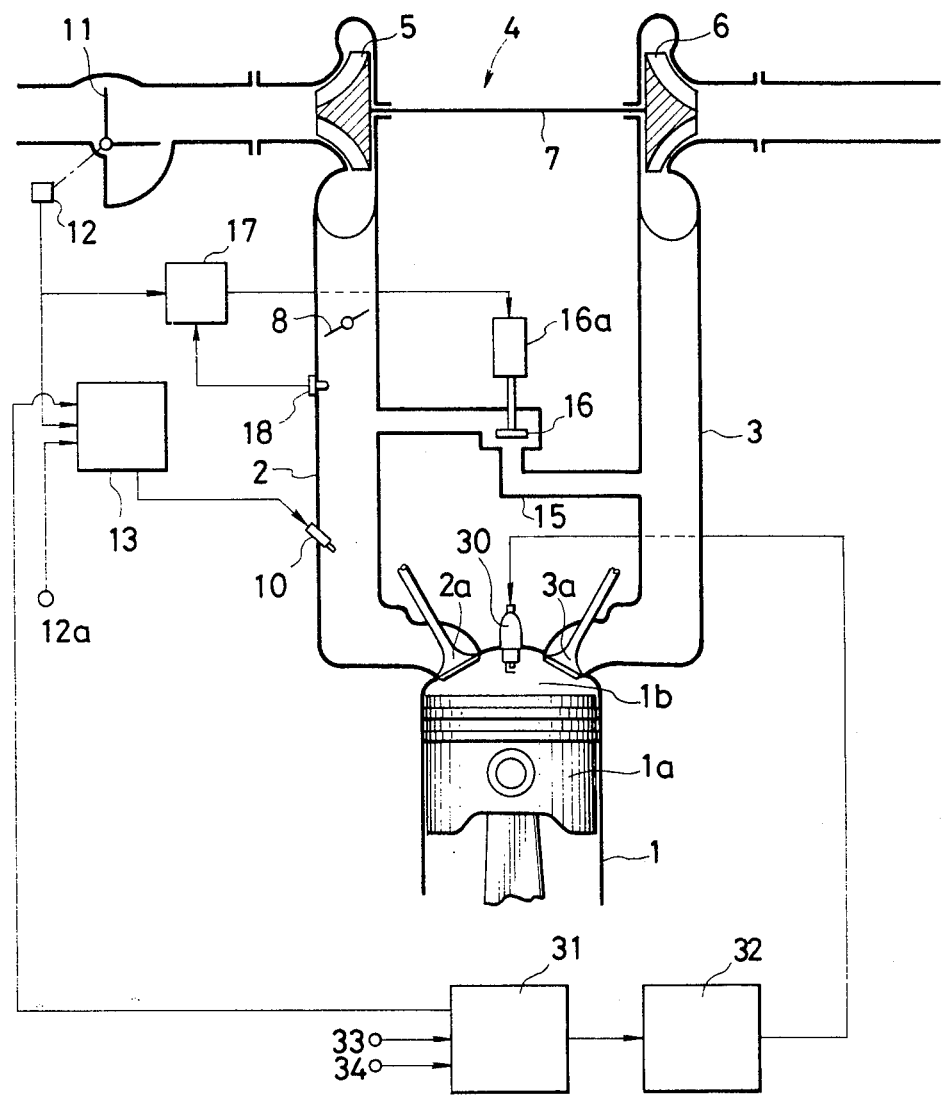
FIG. 1 is a schematic illustration of an internal combustion engine embodying the features of the present invention.

Referring now to the drawings, particularly to FIG. 1, the engine shown therein includes a cylinder 1 and a piston 1a which is disposed in the cylinder 1 for reciprocating movement. Thus, a combustion chamber 1b is defined in the cylinder 1. An intake passage 2 is provided so as to lead to the combustion chamber 1b through an intake valve 2a. Similarly, an exhaust passage 3 is provided so as to communicate with the combustion chamber 1b through an exhaust valve 3a. The engine includes a turbo-supercharger 4 which comprises a compressor 5 located in the intake passage 2 and an exhaust gas turbine 6 located in the exhaust passage 3. The compressor 5 is connected with the turbine 6 through a shaft 7 so that the former is driven by the latter.

In the intake passage 2, there is provided a throttle valve 8 which is located downstream of the compressor 5 and a fuel injection nozzle 10 is provided further downstream of the throttle valve 8. At the upstream side of the compressor 5, there is an air flowmeter 11 having a potentiometer 12 for producing an air flow signal. The air flow signal from the potentiometer 12 is applied to a fuel injection control circuit 13. The control circuit 13 further receives an engine speed signal from engine speed sensor 12a and determines the amount of fuel to be supplied through the fuel injection nozzle 10.

Between the intake passage 2 and the exhaust passage 3, there is provided an exhaust gas recirculation passage 15 which opens to the intake passage 2 downstream of the throttle valve 8. A recirculation control valve 16 is provided in the passage 15. The valve 16 includes a solenoid 16a which functions to open the valve 16 proportionally to the electric current supplied thereto. In order to provide an electric current supplied to the solenoid 16a, there is recirculation control circuit 17 which receives the air flow signal from the potentiometer 12. Thus, the control circuit 17 functions to supply current to the solenoid 16a in accordance with the air flow to the combustion chamber 1b.

In the combustion chamber 1b, there is an ignition plug 30 which is supplied with a high voltage power from an ignition coil 32 which is controlled by an ignition control circuit 31. The ignition control circuit 31 receives an intake suction pressure signal from an intake suction pressure sensor 33 and an engine phase signal from an engine phase detector 34 and determines a suitable ignition timing. As shown in FIG. 1, an intake gas temperature sensor 18 is provided in the intake passage 2 and produces an intake gas temperature signal which is applied to the control circuits 13, 17 and 31.

Figure 2:
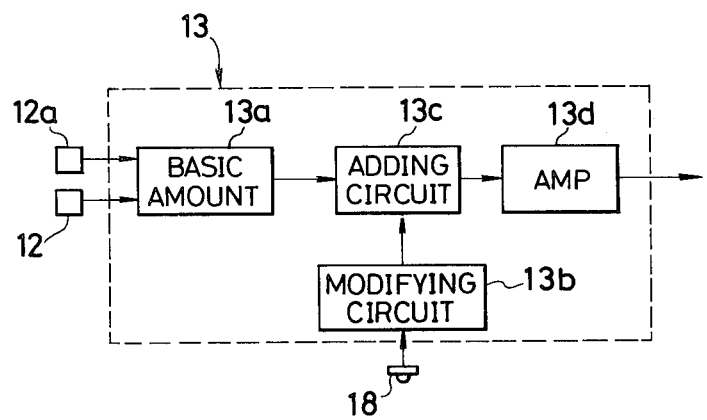
FIG. 2 is a block diagram showing the details of the fuel injection control circuit.

Referring now to FIG. 2, it will be noted that the fuel injection control circuit 13 includes a basic amount determining circuit 13a which receives the air flow signal from the potentiometer 12 and the engine speed signal from the engine speed sensor 12a and determines a suitable amount of fuel supply in accordance with the intake air flow and the engine speed. The details of the circuit 13a is well known in the art so that detailed descriptions will not be made further.

Figure 3:
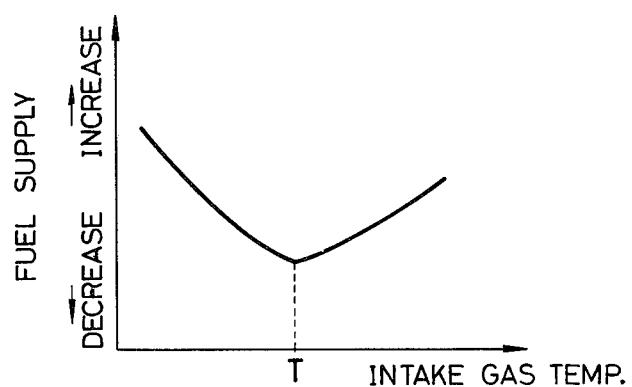
FIG. 3 is a diagram showing one example of control of fuel supply in accordance with a change in the intake gas temperature.
Figure 4:
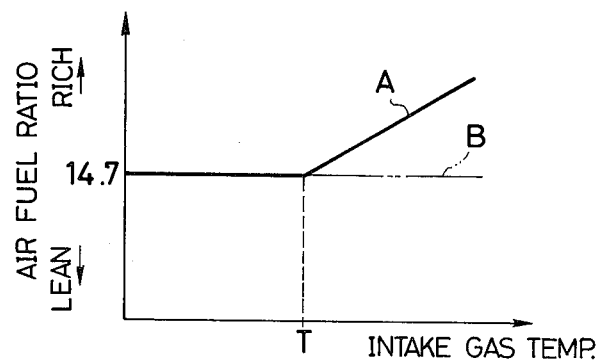
FIG. 4 is a diagram showing the change in the air-fuel mixing ratio.

The control circuit 13 further includes a modifying circuit 13b which receives the intake gas temperature signal from the temperature sensor 18 and produces a modifying signal in accordance with the intake gas temperature. The modifying signal from the modifying circuit 13b is applied to an adding circuit 13c to be added to the basic amount signal from the circuit 13a so as to produce a modified signal. The modified signal is passed to an amplifier 13d and applied to the fuel injection nozzle 10 to perform an appropriate control of fuel supply. As shown in FIG. 3, the modifying circuit 13b in this embodiment functions to decrease the amount of fuel supply in response to an increase in the intake gas temperature under a temperature range lower than a predetermined value T so that an air-fuel ratio of substantially the stoichiometric value is maintained as shown in FIG. 4. With the intake gas temperature higher than the value T, the modifying circuit 13b functions to increase the amount of fuel supply in response to an increase in the intake gas temperature so that the air-fuel mixture to be supplied to the combustion chamber 1b is enriched as shown by a line A in FIG. 4. The value T may be a temperature slightly lower than the temperature at which explosive combustion or detonation is likely take place if the air-fuel ratio is maintained substantially at the stoichiometric value as shown by a line B in FIG. 4.

According to the arrangement described above, the air-fuel mixture is enriched in the intake gas temperature range above the value T so that it is possible to suppress fast combustion of the mixture to thereby prevent explosive combustion or detonation even under a very high intake gas temperature. Under the intake gas temperature lower than the value T, the mixing ratio may not be maintained at the stoichiometric value as described but the mixture may be leaner or richer than the stoichiometric value. Further, the mixing ratio may not necessarily be substantially constant under the temperature range lower than the value T.

Figure 5:
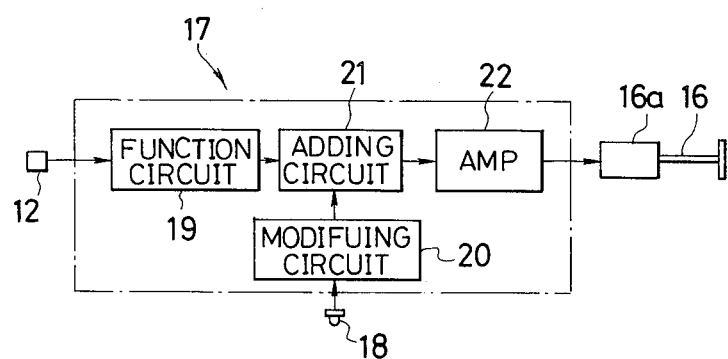
FIG. 5 is a block diagram showing the details of the exhaust gas recirculation control circuit.

Referring now to FIG. 5, there is shown the details of the exhaust gas recirculation control circuit 17. The control circuit 17 includes a function circuit 19 which receives the air flow signal from the potentiometer 12 and produces a basic recirculation signal in accordance with the intake air flow into the combustion chamber 1b. The control circuit 17 further includes a modifying circuit 20 which receives the intake gas temperature signal from the sensor 18 and produces a modifying signal which is applied to an adding circuit 21. The modifying signal is added in the circuit 21 to the basic recirculation signal to produce a modified signal which is amplified in an amplifier 22 and applied to the solenoid 16a of the valve 16.

Figure 6:
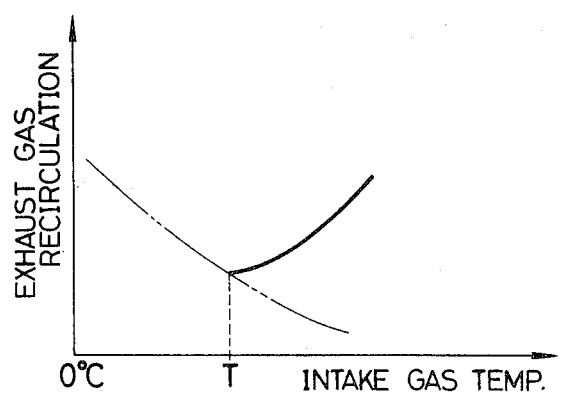
FIG. 6 is a diagram showing one example of control of the exhaust gas recirculation.

As shown by broken lines in FIG. 6, the basic recirculation signal is decreased in response to an increase in the intake gas temperature to thereby cause a corresponding decrease in the amount of exhaust gas recirculated to the intake passage 2. The modifying circuit 20 produces the modifying signal in the intake gas temperature range greater than the value T. The modifying signal increases steplessly in response to an increase in the intake gas temperature to thereby cause a corresponding increase in the amount of recirculated gas as shown by a solid line in FIG. 6. Thus, the rate of combustion can be suppressed and detonation can therefore be prevented even under an extremely high intake gas temperature.

Figure 7:
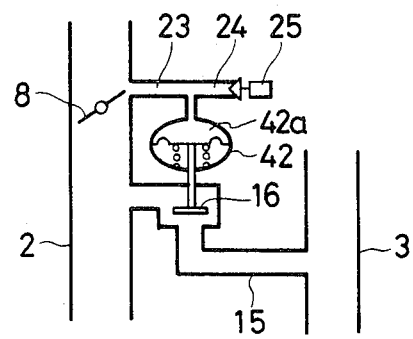
FIG. 7 is a fragmentary sectional view showing another embodiment of the exhaust gas recirculation system.

FIG. 7 shows another example of the exhaust gas recirculation system in which the control valve 16 provided in the recirculation passage 15 is connected with a pneumatic actuator 42 to be actuated thereby. The actuator 42 has a suction pressure chamber 42a which is connected to a suction pressure passage 23 opened to the intake passage 2 in the vicinity of the throttle valve 8. Therefore, a suction pressure is introduced into the chamber 42a as the throttle valve 8 opens beyond a predetermined position to thereby open the valve 16. The passage 23 has a relief port 24 which is provided with a solenoid valve 25. The output of the amplifier 22 shown in FIG. 5 is applied to the solenoid valve 25 to accomplish the same result.

Figure 8:
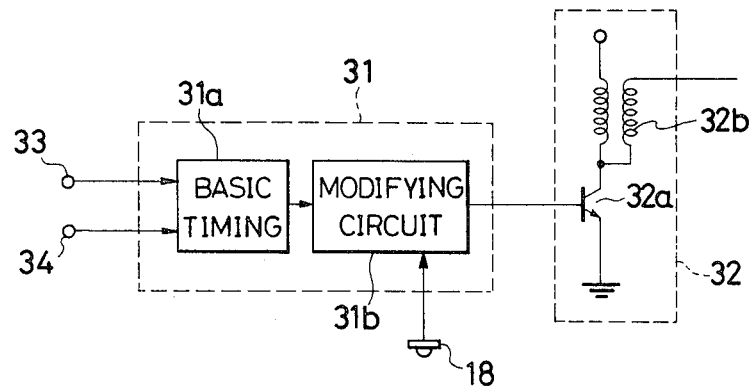
FIG. 8 is a block diagram showing the ignition timing control circuit.

Referring now to FIG. 8, there is shown the details of the ignition control circuit 31. The control circuit 31 includes a basic timing determining circuit 31*a* which receives the intake suction pressure signal from the sensor 33 and the crank phase signal from the sensor 34 and produces an ignition trigger basic signal at a suitable timing. The basic signal is applied to a modifying circuit 31*b* which receives the intake gas temperature signal from the sensor 18 and produces a trigger signal at a timing modified in accordance with the intake gas temperature. The trigger signal is applied to a trigger control transistor 32*a* of the ignition coil 32.

Figure 9:
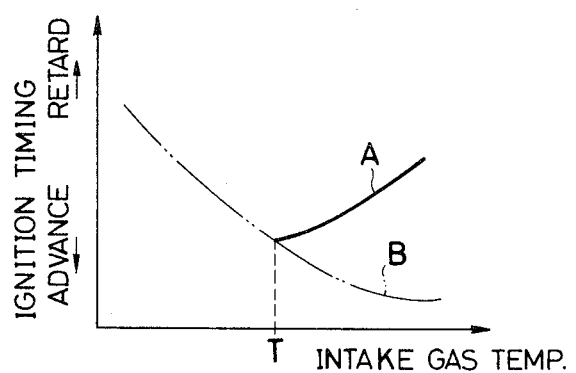
FIG. 9 is a diagram showing one example of the ignition timing control.

The circuit 31*a* provides the aforementioned basic trigger signal at a timing which is advanced in response to an increase in the intake gas temperature as shown by a broken line B in FIG. 9. In the intake gas temperature range higher than the value T, the timing is modified by the circuit 31*b* as shown by a line A in FIG. 9. Therefore, fast combustion can be suppressed and detonation can therefore be prevented even under a very high intake gas temperature.

It may not be necessary to control all of the air-fuel ratio, the amount of recirculated exhaust gas and the ignition timing in the temperature range higher than the value T, but a satisfactory result can be obtained by controlling only one or two of these factors.

The invention has thus been shown and described with reference to specific embodiments, however, it should be noted that the invention is in no way limited to the details of the illustrated arrangement but changes and modifications may be made without departing from the scope of the appended claims.

We claim:

1. A supercharged internal combustion engine including combustion chamber means, intake passage means having supercharging means and leading to said combustion chamber means, means for providing combustible air-fuel mixture which is to be charged to said combustion chamber means, ignition means for igniting the air-fuel mixture charged in the combustion chamber means, exhaust passage means extending from said combustion chamber means for exhausting combustion gas from said combustion chamber means, intake gas temperature sensing means for sensing temperature of intake gas passing through said intake passage means downstream of said supercharging means, fuel supply control means for controlling said air-fuel mixture means, said fuel supply control means including means for determining basic fuel quantity, modifying means responsive to the temperature of the intake gas to produce a modifying signal for decreasing fuel supply in response to an increase in the temperature of the intake gas when the temperature is below a predetermined value to maintain the air-fuel ratio of the mixture substantially constant, and enriching the mixture when the temperature is above the predetermined value, and means for determining the quantity of fuel supply based on outputs from said basic fuel quantity determining means and said modifying means.

2. An engine in accordance with claim 1 in which said modifying means includes means for changing air-fuel ratio of the mixture gradually in accordance with a change in the intake gas temperature.

* * * * *